(12) United States Patent
Oh et al.

(10) Patent No.: US 10,752,091 B2
(45) Date of Patent: Aug. 25, 2020

(54) RADIANT HEATER FOR VEHICLE

(71) Applicants: HYUNDAI MOTOR COMPANY, Seoul (KR); KIA MOTORS CORPORATION, Seoul (KR); HANON SYSTEMS, Daejeon (KR)

(72) Inventors: Dong Hoon Oh, Daejeon (KR); Soo Doo Park, Daejeon (KR); Kil Sang Jang, Daejeon (KR); Man Ju Oh, Yongin-si (KR); Jae Woong Kim, Hwaseong-si (KR); So La Chung, Seoul (KR)

(73) Assignees: HYUNDAI MOTOR COMPANY, Seoul (KR); KIA MOTORS CORPORATION, Seoul (KR); HANON SYSTEMS, Daejeon (KR)

( * ) Notice: Subject to any disclaimer, the term of this patent is extended or adjusted under 35 U.S.C. 154(b) by 290 days.

(21) Appl. No.: 15/741,752

(22) PCT Filed: Jul. 22, 2016

(86) PCT No.: PCT/IB2016/054379
§ 371 (c)(1),
(2) Date: Jan. 3, 2018

(87) PCT Pub. No.: WO2017/006303
PCT Pub. Date: Jan. 12, 2017

(65) Prior Publication Data
US 2018/0194199 A1 Jul. 12, 2018

(30) Foreign Application Priority Data

Jul. 3, 2015 (KR) .......................... 10-2015-0094971

(51) Int. Cl.
| | | |
|---|---|---|
| H05B 3/34 | (2006.01) | |
| B60H 1/22 | (2006.01) | |
| H05B 3/12 | (2006.01) | |

(52) U.S. Cl.
CPC ......... B60H 1/2215 (2013.01); B60H 1/2226 (2019.05); H05B 3/12 (2013.01);
(Continued)

(58) Field of Classification Search
CPC . H05B 3/12; H05B 3/34; H05B 3/342; H05B 2203/029; B60H 1/2215; B60H 1/2226
See application file for complete search history.

(56) References Cited

U.S. PATENT DOCUMENTS

2009/0051196 A1* 2/2009 Ishii ...................... H05B 3/146
297/180.12

FOREIGN PATENT DOCUMENTS

JP 2008-6955 A 1/2008
JP 2014-3000 A 1/2014
(Continued)

OTHER PUBLICATIONS

Machine Translation of Abe JP 55-31808—Dec. 12, 2019 (Year: 2012).*
(Continued)

*Primary Examiner* — Brian W Jennison
(74) *Attorney, Agent, or Firm* — McDonnell Boehnen Hulbert & Berghoff LLP (57) ABSTRACT

The present invention relates to a radiant heater for a vehicle, the radiant heater including: a base fabric; a heating member stacked on the base fabric; a fixing member fixing the heating member to the base fabric; and a laminated fabric stacked on an upper side of the fixing member and combined with the base fabric. Thus, the heater can be formed in a woven form and thus manufactured quickly and simply, and (Continued)

a heating temperature of the heater can be easily controlled according to a location by only controlling a resistance pattern, thereby provide a more uniform warmth to a passenger of the vehicle.

8 Claims, 11 Drawing Sheets

(52) U.S. Cl.
CPC .............. *H05B 3/34* (2013.01); *H05B 3/342* (2013.01); *H05B 2203/029* (2013.01)

(56) References Cited

FOREIGN PATENT DOCUMENTS

| | | |
|---|---|---|
| JP | 5531808 B2 | 6/2014 |
| JP | 2014-189251 A | 10/2014 |
| KR | 10-1433515 B1 | 8/2014 |
| WO | 2007/110976 A1 | 10/2007 |

OTHER PUBLICATIONS

International Search Report dated Nov. 8, 2016 of PCT/IB2016/054379 which is the parent application and its English translation—4 pages.

\* cited by examiner

RADIANT HEATER FOR VEHICLE

TECHNICAL FIELD

The present invention relates to a radiant heater for a vehicle, the radiant heater being configured to emit radiant heat directly toward a passenger at an early stage of starting of the vehicle in winter, thereby enhancing a comforting heating effect, wherein the radiant heater is formed in a woven shape whereby quick and simple manufacture is achieved, and heating temperature depending on a location is easily controlled by only controlling a resistance pattern whereby more uniform warmth is provided to the passenger of the vehicle.

BACKGROUND ART

As well known in the art, since cooling water cannot be heated sufficiently at an early stage of starting of a vehicle in winter, the interior of the vehicle cannot be heated quickly. Accordingly, a radiant heater emitting radiant heat can be mounted in the interior of the vehicle to emit radiant heat directly toward a passenger such that a comforting heating effect is enhanced.

Such a radiant heater for a vehicle is mounted in the interior of the vehicle at a position of the lower side of a dashboard, a steering column of a driver's seat side, a glove box of a passenger seat side, or a backrest of a front seat, etc., and emits radiant heat directly toward legs of a passenger, thereby performing quick heating.

Figure 1:
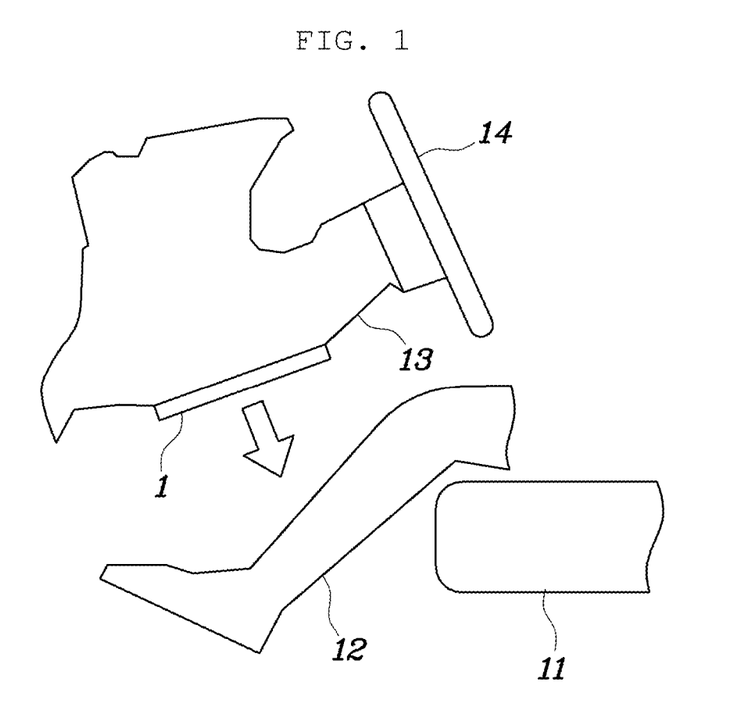
FIGS. 1 to 2 are schematic views showing an example in which a conventional radiant heater is mounted in a vehicle and a configuration of the radiant heater.
Figure 2:
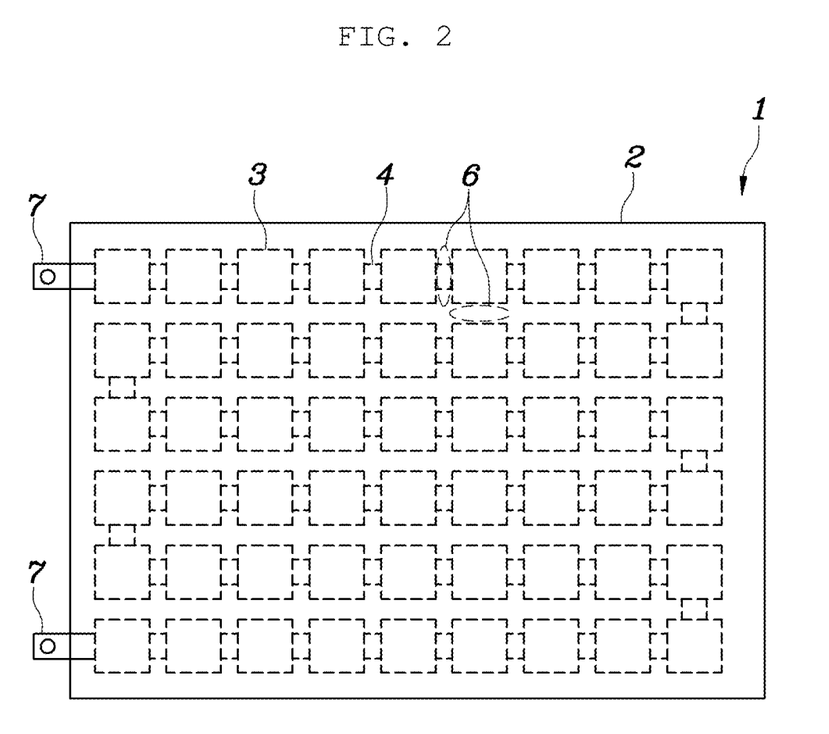

For example, as shown in FIG. 1, a conventional radiant heater 1 is configured such that the radiant heater 1 is mounted on a lower surface of a steering column 13 connected to a steering wheel 14 of a vehicle driver's seat, and emits radiant heat toward legs 12 of a driver sitting on a seat 11. As shown in FIG. 2, the radiant heater 1 has a structure in which a substrate 2, and a radiating portion 3, a heating portion 4, and a terminal 7 are provided on a substrate 2. Further, the radiant heater 1 includes a plurality of radiating portions 3 and a plurality of heating portions 4, wherein the radiating portions 3 have a thin plate shape and the plurality of radiating portions 3 are arranged to be distanced from each other. A low heat conducting portion 6 made of a resin is provided between adjacent radiating portions 3 so that the radiating portions 3 are surrounded by the low heat conducting portion 6.

However, such a radiant heater for a vehicle has disadvantages in that it is necessary that the radiating portions that are heaters should be arranged on the substrate, the low heat conducting portions should be formed by using the resin, and the heating portions should be closely coupled thereto, leading to a complicated structure and thus it is difficult to manufacture. In addition, in order to control the heating temperature differently depending on the location, the arrangement and the number of the radiating portions need to be controlled, which causes a problem in that a structure for electrically connecting the radiating portions is complicated, and the arrangement of the radiating portions is not easy.

DOCUMENTS OF RELATED ART

Patent Document 1

Japanese Patent Application Publication No. 2014-003000 (2014 Jan. 9)

DISCLOSURE

Technical Problem

Accordingly, the present invention has been made keeping in mind the above problems occurring in the prior art, and an object of the present invention is to provide a radiant heater for a vehicle, wherein the radiant heater is formed in a woven shape whereby quick and simple manufacture is achieved, and heating temperature depending on a location is easily controlled by only controlling a resistance pattern whereby more uniform warmth is provided to a passenger of the vehicle.

Technical Solution

In order to accomplish the above object, the present invention provides radiant heater for a vehicle, the radiant heater including: a base fabric 110; a heating member 120 stacked on the base fabric 110; a fixing member 130 fixing the heating member 120 to the base fabric 110; and a laminated fabric 140 stacked on an upper side of the fixing member 130 and combined with the base fabric 110.

Further, the heating member 120 may include: a plurality of resistance heating members 121 formed in a linear shape and arranged in parallel; and electrode members 122 connected to opposite ends of the resistance heating members 121, respectively.

Further, the fixing member 130 may be made of a fiber, and the fiber may be sewn to the base fabric 110 such that the heating member 120 is fixed to the base fabric 110.

Further, the resistance heating members 121 may be formed in any one of a straight linear shape, a wedge shape, and a curved linear shape, or a combination of two or more of the straight linear shape, the wedge shape, and the curved linear shape.

Further, the resistance heating members 121 may be arranged such that an interval of the resistance heating members arranged at a first side is narrower than an interval of the resistance heating members arranged at a second side.

Further, the resistance heating members 121 may be configured such that lengths of first sides are shorter than lengths of second sides on the basis of a same area.

Further, the resistance heating members 121 may be configured such that one resistance heating member 121 is formed in a shape in which two or more resistance patterns having different shapes are connected to each other.

Further, the electrode members 122 may extend continuously at the opposite ends of the resistance heating members 121, respectively, such that the resistance heating members 121 are connected to each other in parallel, or the electrode members may be separated into two or more portions that are discontinued such that the resistance heating members 121 are connected to each other in a combination of series and parallel.

Further, the base fabric 110 may be any one of a nonwoven fabric made of polyester or polyethylene terephthalate (PET), a glass fiber fabric, and a glass fiber impregnated material.

Further, the resistance heating members 121 may be made of a metal wire including aluminum, copper, and nichrome, or a carbon-based wire including carbon fibers.

Advantageous Effects

As described above, according to the present invention, the radiant heater can be formed in a woven shape whereby it is possible to achieve quick and simple manufacture. In addition, the heating temperature depending on the location can be easily controlled by only controlling the resistance pattern whereby it is possible to provide more uniform warmth to a passenger of a vehicle.

BEST MODE

Hereinafter, a radiant heater for a vehicle according to the present invention will be described in detail with reference to the accompanying drawings.

Figure 3:
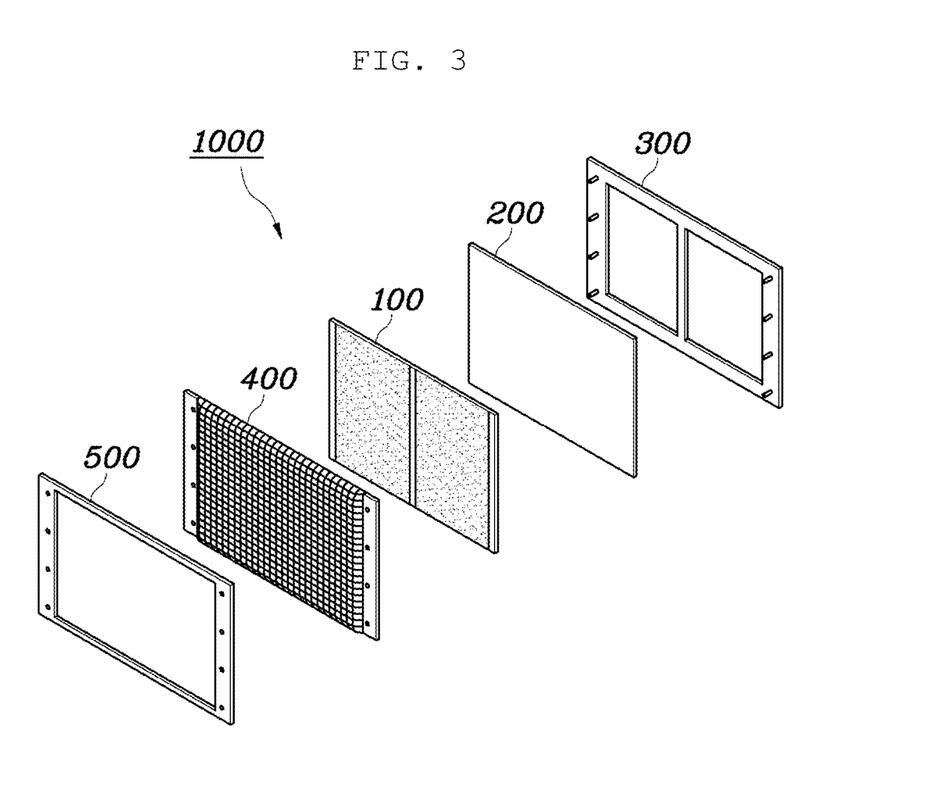
FIG. 3 is an exploded perspective view showing a radiant heater assembly for a vehicle, which includes a radiant heater for a vehicle according to the present invention.
Figure 4:
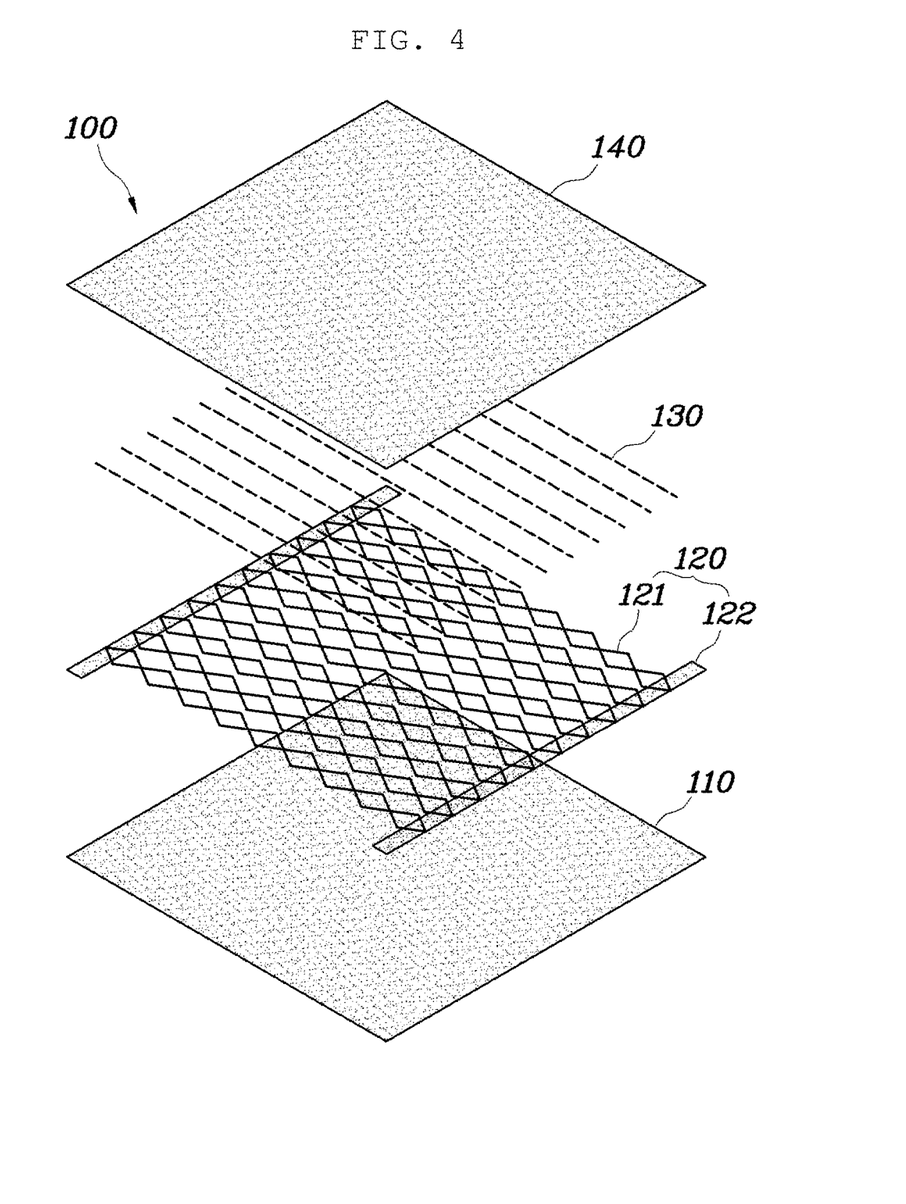
FIG. 4 is an exploded perspective view showing the radiant heater for the vehicle according to the present invention.
Figure 5:
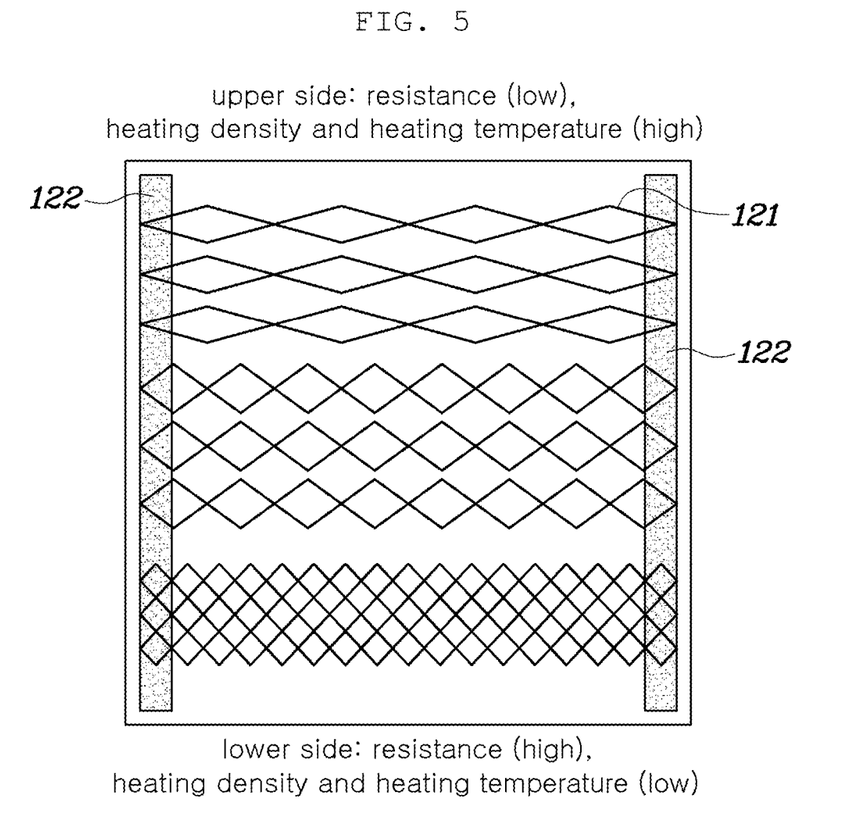
FIGS. 5 to 8 are schematic views showing embodiments in which left and right sides or upper and lower sides differ from each other in heating temperature depending on pattern and arrangement of a resistance heating member of a heating member according to the present invention.
Figure 6:
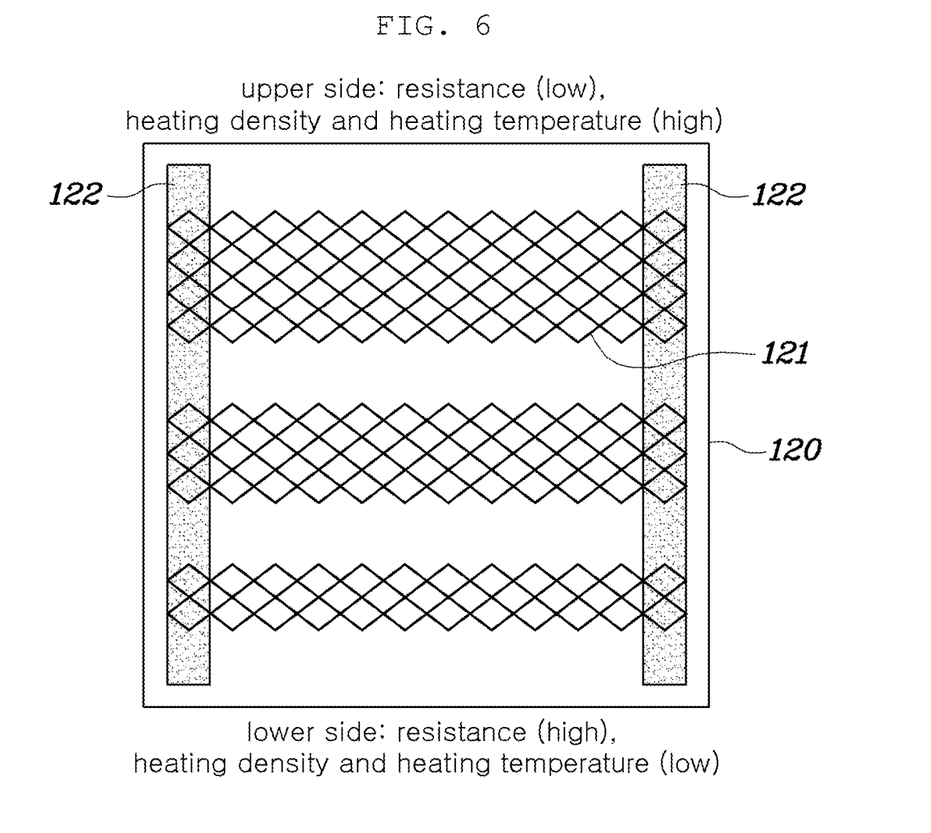
Figure 7:
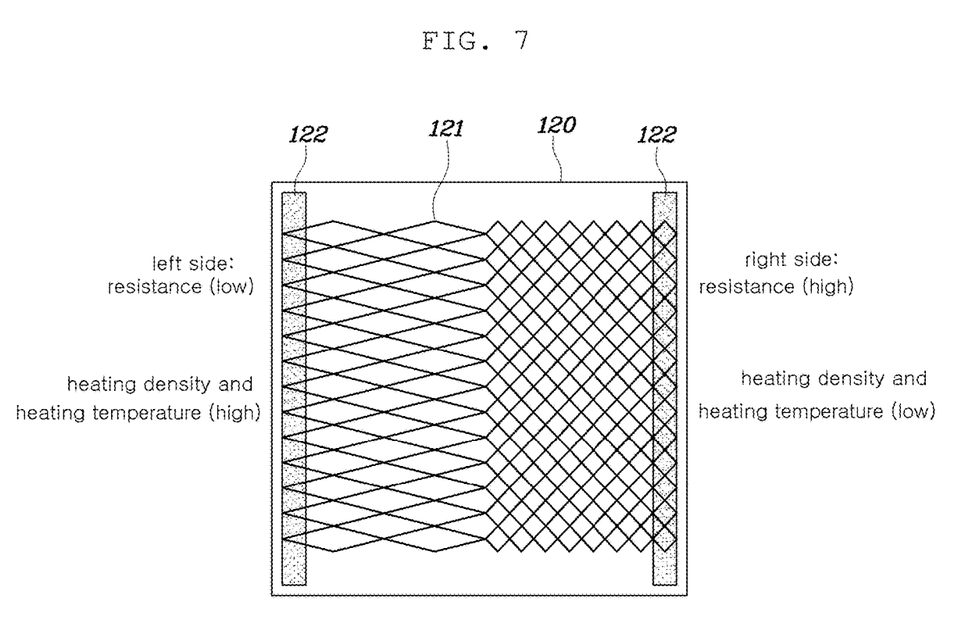
Figure 8:
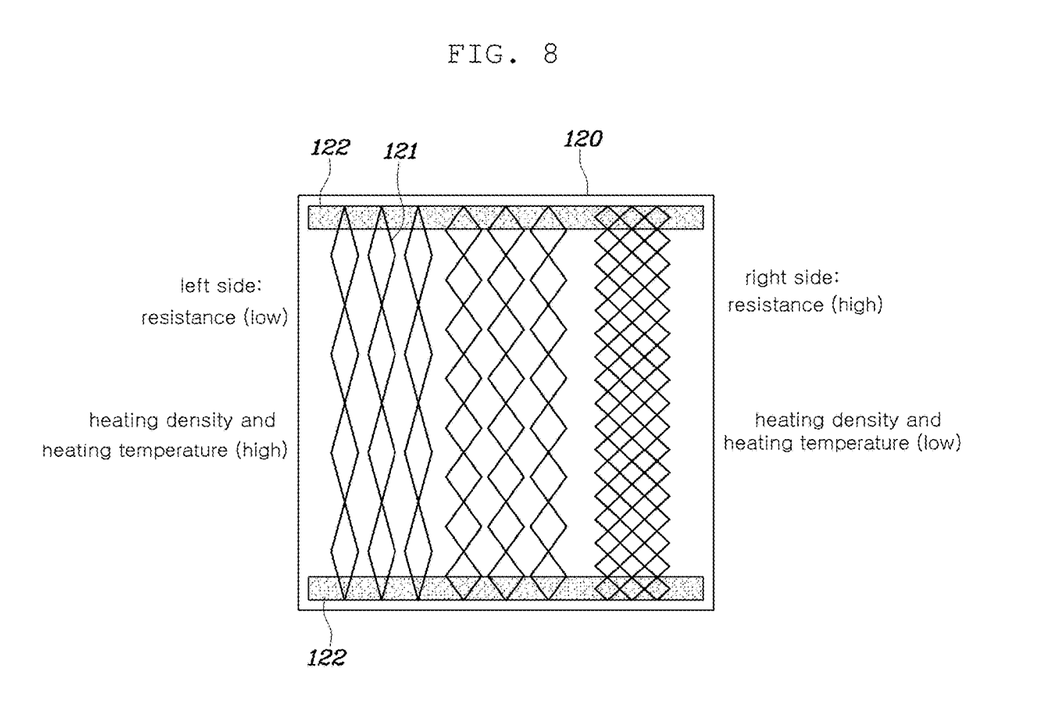

FIG. 3 is an exploded perspective view showing a radiant heater assembly for a vehicle, which includes a radiant heater for a vehicle according to the present invention, and FIG. 4 is an exploded perspective view showing the radiant heater for the vehicle according to the present invention.

As shown in the drawings, the radiant heater 100 for a vehicle of the present invention includes: a base fabric 110; a heating member 120 stacked on the base fabric 110; a fixing member 130 fixing the heating member 120 to the base fabric 110; and a laminated fabric 140 stacked on the fixing member 130 and combined with the base fabric 110.

First, the radiant heater 100 for a vehicle of the present invention may be configured such that the base fabric 110, the heating member 120, the fixing member 130, and the laminated fabric 140 are stacked on top of each other in a sequence, wherein the heating member 120 is fixed to the base fabric 110 by the fixing member 130 in a state where the heating member 120 is stacked on the base fabric 110, the laminated fabric 140 is stacked on the fixing member 130, and the laminated fabric 140 is combined with the base fabric 110.

Herein, the base fabric 110 and the laminated fabric 140 may be made of a fabric that is a heat resistant material resisting high temperature generated from the heating member 120 while an electrically insulating material. Further, the fixing member 130 may be provided in various forms to fix the heating member 120 to the base fabric 110, and the fixing member 130 may also be an electrically insulating material and a heat resistant material. Furthermore, the laminated fabric 140 may be adhered and fixed to the base fabric 110 using an adhesive.

Herein, the heating member 120 may include: a plurality of resistance heating members 121 having a linear shape and arranged in parallel; and electrode members 122 connected to opposite ends of the resistance heating members 121, respectively.

The heating member 120 is structured such that the plurality of resistance heating members 121 having a linear shape are arranged in parallel and the opposite ends thereof are coupled to the electrode members 122, respectively. For example, the resistance heating members 121 may be arranged in parallel such that first ends of the resistance heating members 121 are connected to one of the electrode members 122 and second ends of the resistance heating members 121 are connected to a remaining one of the electrode members 122. In addition, the resistance heating members 121 may be a wire-shaped resistance wire, and may have a linear shape to have flexibility. Further, the electrode members 122 may have a thin plate or membrane shape to have flexibility.

Further, the fixing member 130 may be made of a fiber, wherein the fiber may be sewn to the base fabric 110 such that the heating member 120 is fixed to the base fabric 110.

In other words, in the case that the heating member 120 is configured with the wire-shaped resistance heating members 121, the heating member 120 can be efficiently fixed to the base fabric 130 by using the fixing member 130 made of a fiber. Herein, the heating member 120 is placed on the base fabric 110, and the resistance heating members 121 and the electrode member 122 constituting the heating member 120 are sewn by using a fiber, which constitutes the fixing member 130, and fixed to the base fabric 110. Here, in the case that the heating member 120 is fixed to the base fabric 110 by a method of sewing with the fixing member 130 made of a fiber, the resistance heating members 121 and the electrode members 122 can be sewn by adjusting positions where they are stitched such that the resistance heating member and the electrode member are prevented from being short-circuited during sewing. In addition, the fixing member 130 may be made of various materials such as polyester fibers and Kevlar fibers.

Thus, the heating member can be efficiently fixed to the base fabric in the form of weaving using the base fabric, the laminated fabric, and the fixing member made of a fiber, whereby it is possible to manufacture the radiant heater for a vehicle of the present invention in the form of a fabric in quick and simple manner.

Figure 9:
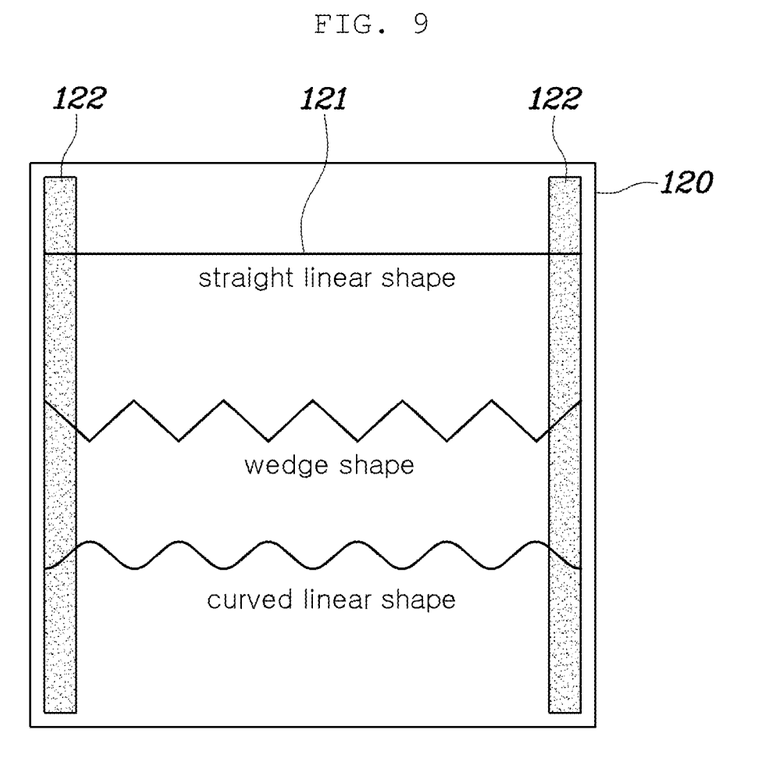
FIG. 9 is a schematic view showing a kind of linear pattern of the resistance heating member according to the present invention.

Further, the resistance heating members 121 may be formed in any one of a straight linear shape, a wedge shape, and a curved linear shape, or a combination of two or more thereof.

In other words, the resistance heating members 121 are formed in a linear shape and may be formed in various shapes such as a straight linear shape, a wedge shape (sawtooth shape), and a curved linear shape (corrugated shape), and the resistance may be formed differently depending on the shape of the resistance heating members 121. In other words, depending on the shape of the resistance heating members 121, the length of the resistance wire per unit length or per unit area can be changed. In addition, the resistance heating members 121 may be formed in the combination of two or more shapes. Herein, for example, in the case that the plurality of resistance heating members 121 are arranged in parallel and the opposite ends of the resistance heating members 121 are connected to the electrode members 122, respectively, the resistance heating members 121 may be configured such that some of the resistance heating members are formed in a straight linear shape while the remainder is formed in a wedge or corrugated shape. Accordingly, the resistance is formed differently whereby the heating temperature can be controlled differently. Alternatively, one resistance heating member 121 may be configured such that two or more shapes are connected to each other, wherein a portion connected to one of the electrode members 122 is formed in a straight linear shape, and a portion connected to a remaining one of the electrode members 122 is formed in a wedge or curved linear shape. Accordingly, the resistance is formed differently whereby the heating temperature can be controlled differently.

Further, in the case that the resistance heating members 121 are formed in a wedge or curved linear shape, the amplitude or the period of the waveform of the resistance pattern may be varied, such that some of the resistance heating members 121 have a dense resistance pattern while the remainder has a sparse resistance pattern. Alternatively, each of the resistance heating members 121 may be configured such that a portion connected to one of the electrode members 122 has a dense resistance pattern, and a portion connected to a remaining one of the electrode members 122 has a sparse resistance pattern. Accordingly, even in one resistance heating member 121, the resistance of a first side of the resistance member is different from that of a second side of the resistance member whereby the heating temperature can be controlled differently.

Further, the resistance heating members 121 may be configured such that the interval of the resistance heating members arranged at a first side is narrower than that of the resistance heating members arranged at a second side. Further, the resistance heating members 121 may be configured such that the lengths of first sides are shorter than the lengths of second sides on the basis of the same area.

In other words, as shown in the drawing, each of the resistance heating members 121 has different lengths per unit area to form different resistances, whereby the heating density and the heating temperature can be controlled differently. For example, in the case that the resistance pattern of a left side of the resistance heating member is relatively shorter than that of a right side of the resistance heating member in length per unit area (sparse resistance pattern is formed), the resistance of the left side can be lower than that of the right side, and the heating density and the heating temperature of the left side can be higher than those of the right side.

Further, the resistance heating members 121 may be configured such that each of the resistance heating members 121 is formed in a shape in which two or more resistance patterns having different shapes are connected to each other.

In other words, as described above, the resistance heating members 121 may be configured such that each of the resistance heating members 121 is formed in a shape in which two or more resistance patterns having different amplitudes and periods of the resistance pattern waveform are connected to each other, and may be formed in a combination of a straight linear shape and a wedge shape (or a curved linear shape) that are connected to each other.

Figure 10:
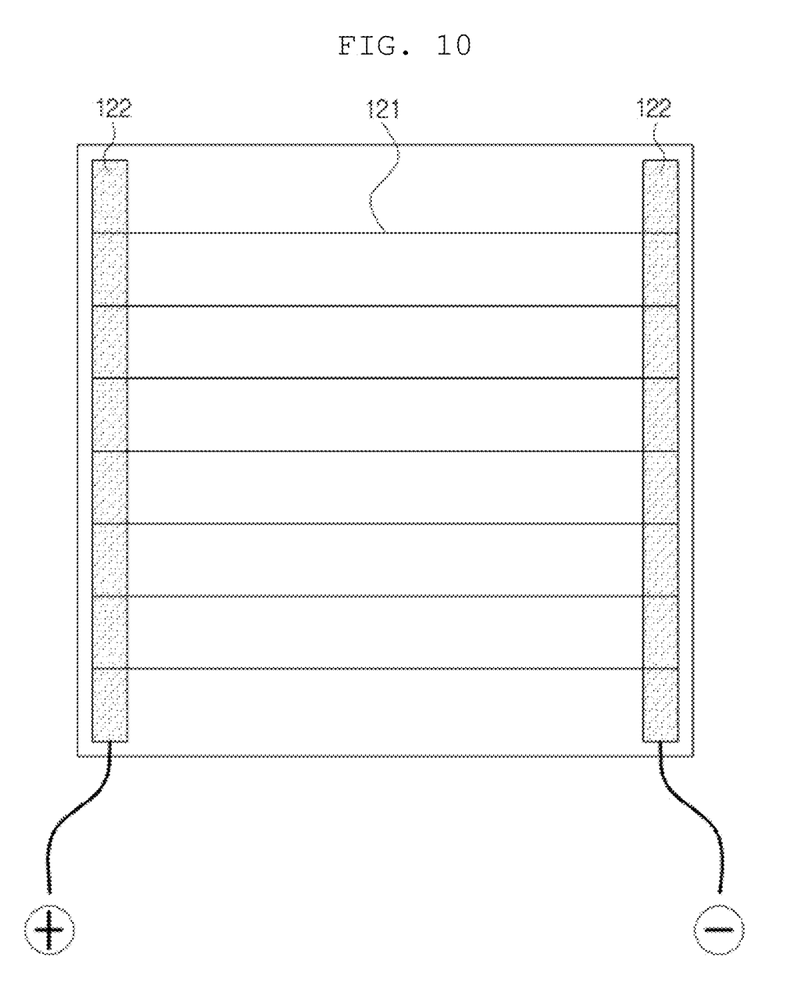
FIG. 10 and FIG. 11 are schematic views showing a state in which parallel connection or combined series and parallel connection of the resistance heating members depending on formation of an electrode member according to the present invention.
Figure 11:
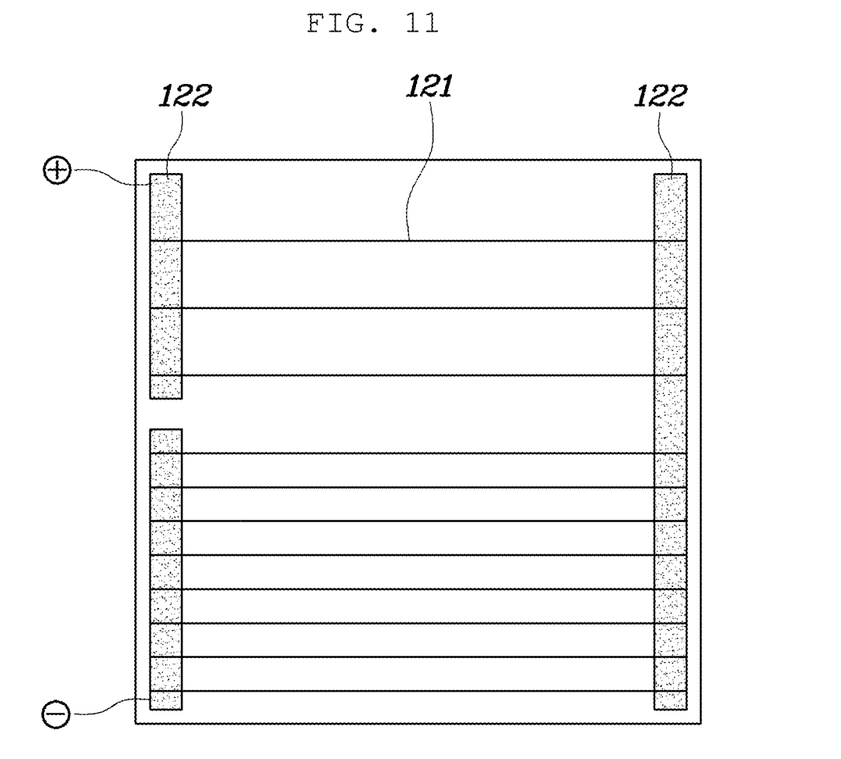

Further, the electrode members 122 may be provided to extend continuously at the opposite ends of the resistance heating members 121, respectively, such that the resistance heating members 121 are connected to each other in parallel, or may be separated into two or more portions that are discontinued such that the resistance heating members 121 are connected to each other in a combination of series and parallel.

In other words, as shown in the drawings, first ends of the resistance heating members 121 are connected to the electrode member 122 that is a positive electrode member extending continuously at a first side and second ends thereof are connected to the electrode member 122 that is a negative electrode member extending continuously at a second side, such that all the resistance heating members 121 are connected to each other in parallel. Alternatively, as shown in the drawings, one of the electrode members 122 may be formed in a shape having a discontinued portion at an intermediate position thereof such that the resistance heating members 121 arranged at an upper side and connected to each other in parallel, and the resistance heating members 121 arranged at a lower side and connected to each other in parallel are connected to each other in series.

As described above, according to the radiant heater for a vehicle according to the present invention, only by controlling the resistance pattern, it is possible to easily control the heating temperature depending on the location, and by increasing the heat density and the heating temperature at the lower side of the radiant heater for the vehicle and at a portion thereof toward the window side, it is possible to provide more uniform warmth to a passenger of the vehicle, thereby achieving an enhanced comforting heating effect.

Further, the base fabric 110 may be any one of a nonwoven fabric made of polyester or polyethylene terephthalate (PET), a glass fiber fabric, and a glass fiber impregnated material, or may be made of various fabrics.

Further, the resistance heating members 121 may be made of various materials such as a metal wire including aluminum, copper, and nichrome, or a carbon-based wire including carbon fibers.

Further, the laminated fabric 140 may be made of the same or similar material as the base fabric 110, and may be formed variously according to the purpose of use, appearance, and the like.

Further, as shown in FIG. 3, a radiant heater assembly 1000 for a vehicle, which includes a radiant heater 100 for a vehicle of the present invention, may be configured such that a front cover 500, a safety mesh 400, the radiant heater 100, a heat insulating material 200, and a back cover 300 are stacked in a sequence, and the front cover 500 and the back cover 300 are combined whereby the safety mesh 400, the radiant heater 100, and the heat insulating material 200 are fixed. Herein, the front cover 500 may be formed in a frame shape such that the edge of the safety mesh 400 is fixed thereto, and a plurality of coupling holes may be formed in the front cover 500 so that fixing pins protruding on the back cover 300 are inserted and coupled to the coupling holes of the front cover 500. Further, the safety mesh 400 may formed in a net shape such that radiant heat generated from the radiant heater 100 is emitted toward the front side, and the edge thereof may be fixed between the front cover 500 and the back cover 300. Alternatively, the heat insulating material 200 may be adhered and fixed to a rear surface of the radiant heater 100 by using a hot melt adhesive, an adhesive, a tape, or the like.

Although a preferred embodiment of the present invention has been described for illustrative purposes, those skilled in the art will appreciate that various modifications, additions and substitutions are possible, without departing from the scope and spirit of the invention as disclosed in the accompanying claims.

DESCRIPTION OF THE REFERENCE NUMERALS IN THE DRAWINGS

1000: radiant heater assembly for a vehicle
100: radiant heater for a vehicle

110: base fabric
120: heating member
121: resistance heating member
122: electrode member
130: fixing member
140: laminated fabric
200: heat insulating material
300: back cover
400: safety mesh
500: front cover

The invention claimed is:

1. A radiant heater for a vehicle, the radiant heater comprising:
 a base fabric;
 a heating member stacked on the base fabric;
 a fixing member fixing the heating member to the base fabric; and
 a laminated fabric stacked on an upper side of the fixing member and combined with the base fabric;
 wherein the heating member includes:
  a plurality of resistance heating members formed in a linear shape and arranged in parallel; and
  electrode members connected to opposite ends of the resistance heating members, respectively;
  wherein a first end of each of the resistance heating members is connected to a positive electrode member extending continuously at a first side, and a second end of each of the resistance heating members is connected to a negative electrode member extending continuously at a second side, such that all the resistance heating members are connected to each other in parallel; and
 wherein at least one of the electrode members is formed in a shape having a discontinued portion at an intermediate position thereof, such that the resistance heating members arranged at an upper side and connected to each other in parallel, and the resistance heating members arranged at a lower side and connected to each other in parallel are connected to each other in series.

2. The radiant heater of claim 1, wherein the fixing member is made of a fiber, and the fiber is sewn to the base fabric such that the heating member is fixed to the base fabric.

3. The radiant heater of claim 1, wherein the resistance heating members are formed in any one of a straight linear shape, a wedge shape, and a curved linear shape, or a combination of two or more of the straight linear shape, the wedge shape, and the curved linear shape.

4. The radiant heater of claim 1, wherein the resistance heating members are arranged such that an interval of the resistance heating members arranged at a first side is narrower than an interval of the resistance heating members arranged at a second side.

5. The radiant heater of claim 1, wherein the resistance heating members are configured such that lengths of first sides are shorter than lengths of second sides on the basis of a same area.

6. The radiant heater of claim 1, wherein the resistance heating members are configured such that one resistance heating member is formed in a shape in which two or more resistance patterns having different shapes are connected to each other.

7. The radiant heater of claim 1, wherein the base fabric is any one of a nonwoven fabric made of polyester or polyethylene terephthalate (PET), a glass fiber fabric, and a glass fiber impregnated material.

8. The radiant heater of claim 1, wherein the resistance heating members are made of a metal wire including aluminum, copper, and nichrome, or a carbon-based wire including carbon fibers.

* * * * *